(12) United States Patent
Mikkelsen, Jr. et al.

(10) Patent No.: US 6,559,820 B1
(45) Date of Patent: May 6, 2003

(54) TRIBO-ADDRESSED AND TRIBO-SUPPRESSED ELECTRIC PAPER

(75) Inventors: James C. Mikkelsen, Jr., Los Altos, CA (US); Nicholas K. Sheridon, Los Altos, CA (US); Edward A. Richley, Gaithersburg, MD (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,019

(22) Filed: Nov. 24, 1999

Related U.S. Application Data (63) Continuation-in-part of application No. 09/275,880, filed on Mar. 25, 1999, now Pat. No. 6,243,058.

(51) Int. Cl.⁷ .................................................. G09G 3/34
(52) U.S. Cl. .............................. 345/84; 345/85; 345/173
(58) Field of Search .............................. 359/296; 345/84

(56) References Cited

U.S. PATENT DOCUMENTS 5,708,525 A * 1/1998 Sheridon ................... 359/296
5,739,801 A * 4/1998 Sheridon ..................... 345/84
6,243,058 B1 * 6/2001 Mikkelsen et al. ........... 345/84

OTHER PUBLICATIONS

Dow Corning Corporation, Sylgard 184 Silicone Elastomer, Base, and Curing Agent, 1991.*

U.S. application No. 09/037,767, titled Charge Retention Islands for Electric Paper and Applications Thereof, filed Mar. 10, 1998.

U.S. application No. 09/275,880, titled Tribo–Addressed and Tribo–Surpressed Electric Paper, filed Mar. 25, 1999.

* cited by examiner

Primary Examiner—Steven Saras
Assistant Examiner—Srilakshmi K. Kumar
(74) Attorney, Agent, or Firm—Nola Mae McBan (57) ABSTRACT

A display is provided with an insulative layer with electrical properties which have been selected so that the display can be addressed with a stylus and which minimizes the effects of stray triboelectrically generated charges. Also provided is a method of addressing such a display by depositing charges on a surface of the display, maintaining sufficient charge to effect an image change, and then removing the charges.

25 Claims, 3 Drawing Sheets

*FIG. 3*

TRIBO-ADDRESSED AND TRIBO-SUPPRESSED ELECTRIC PAPER

RELATED APPLICATIONS

This application is a a continuation-in-part of application Ser. No. 09/275,880, filed Mar. 25, 1999 now U.S. Pat. No. 6,243,058.

This patent application is related to U.S. patent application Ser. No. 09/449,061 titled "Tribo-Addressed And Tribo-Suppressed Electric Paper", by Mikkelsen et al.

BACKGROUND OF THE INVENTION

1. Field of Invention

The invention relates to the field of visual displays. More particularly, the invention relates to a gyricon or twisting rotatable element visual display having a controlled response to triboelectric charge effects.

2. Description of Related Art

Paper has traditionally been a preferred medium for the presentation and display of text and images. Paper has several characteristics that make it a desirable display medium, including the fact that it is lightweight, thin, portable, flexible, foldable, high-contrast, low-cost, relatively permanent, and readily configured into a myriad of shapes. It can maintain its displayed images without using any electricity. Paper can also be read in ambient light and can be written or marked upon with a pen, pencil paintbrush, or any number of other implements, including a computer printer.

Unfortunately, paper is not well suited for real-time display purposes. Real-time imagery from computer, video, or other sources cannot be displayed directly with paper, but must be displayed by other means, such as by a cathode-ray tube (CRT) display or a liquid-crystal display (LCD). However, real-time display media lack many of the desirable qualities of paper, such as physical flexibility and stable retention of the displayed image in the absence of an electric power source. Electric paper combines the desirable qualities of paper with those of real-time display media. Like ordinary paper, electric paper can be written and erased, can be read in ambient light and can retain imposed information in the absence of an electric field or other external retaining force. Also like ordinary paper, electric paper can be made in the form of a light-weight, flexible, durable sheet that can be folded or rolled into a tubular form about any axis and placed into a shirt or coat pocket, and then later retrieved, re-straightened, and read without loss of information. Yet unlike ordinary paper, electric paper can be used to display full-motion and other real-time imagery as well as still images and text. Thus, electric paper can be used in a computer system display screen or a television.

The gyricon, also called the twisting ball display, rotary ball display, particle display, dipolar particle light valve, rotating element display, etc., provides a technology for making electric paper. A gyricon display is made up of a multiplicity of optically anisotropic rotatable elements, which can be selectively rotated to present a desired surface to an observer. Additionally, a gyricon display can be addressed similarly to other displays to present any desired image or sequence of images.

The optical anisotropy of the gyricon rotatable elements may be provided by dividing each gyricon rotatable element into at least two visible portions. For instance, one portion of the surface of each gyricon rotatable element will have a first light reflectance or color. If only two portions are used then the other portion of the surface of the gyricon rotatable element has a different color or a different light reflectance. One example of this is a gyricon rotatable element which is spherically shaped and has two distinct hemispheres, one black and the other white. Additionally, each light reflectance characteristic or color will have a distinct electrical characteristic, e.g., a zeta potential with respect to a dielectric fluid. Accordingly, the gyricon rotatable elements are electrically as well as optically anisotropic. It is conventionally known that when particles are dispersed in a dielectric liquid, the particles acquire an electric charge related to the zeta potential of their surfaces.

The black-and-white gyricon rotatable elements are embedded in a sheet of optically transparent material, such as an elastomer layer, that contains a multiplicity of cavities. Each of the cavities is permeated by a transparent dielectric fluid, such as a plasticizer. The fluid-filled cavities accommodate the gyricon rotatable elements, one gyricon rotatable element per cavity, to prevent the rotatable elements from migrating within the sheet. Each cavity is slightly larger than the size of the gyricon rotatable element so that each gyricon rotatable element can rotate or move slightly within its cavity.

A gyricon rotatable element can be selectively rotated within its respective fluid-filled cavity by applying an electric field, so that either a specific portion of the gyricon rotatable element is exposed to an observer viewing the surface of the sheet. By applying an electric field in two dimensions, for example, using a matrix addressing scheme, the black and white sides of the rotatable elements for instance, can be caused to appear as the image elements, e.g., pixels or subpixels, of a displayed image.

Gyricon displays are described further in U.S. Pat. No. 5,389,945 to Sheridon, incorporated herein by reference in its entirety. The '945 patent discloses that gyricon displays can be made that have many of the desirable qualities of paper, such as flexibility and stable retention of a displayed image in the absence of power, that are not found in CRTs, LCDs, or other conventional display media. Gyricon displays can also be made that are not paper-like, for example, in the form of rigid display screens for flat-panel displays. Other examples of Gyricon displays are described in U.S. Pat. No. 5,717,514 titled "Polychromal Segmented Balls For A Twisting Balls Display" by Sheridon issued Feb. 10, 1998, U.S. Pat. No. 5,754,332 titled "Monolayer Gyricon Display" by Crowley issued May 19, 1998, U.S. Pat. No. 5,604,027 "Some Uses Of Microencapsulation For Electric Paper" by Sheridon issued Feb. 18, 1997, U.S. patent application Ser. No. 08/716,672 titled "Twisting Cylinder Display" by Crowley and Sheridon, filed Sep. 13, 1996, and U.S. Pat. No. 5,894, 367 titled "Twisting Cylinder Display Using Multiple Chromatic Values" by Sheridon, issued Apr. 13, 1999. These describe many variations of gyricon displays including monolayer construction, cylindrical rotating elements, and rotating elements constructed to display more than two colors or constructed as light valves.

SUMMARY OF THE INVENTION

Conventional gyricon displays, as described in U.S. Pat. Nos. 4,126,854, 4,143,103, 5,604,027, 5,717,514, 5,894, 367, 5,739,801 and U.S. patent application Ser. No. 08/716, 672, each incorporated herein by reference in its entirety, require a source of electrical power. Gyricon materials respond to the application of high electric fields. However, the electric current requirements can be very low. Basically, the energy required to change the state of the display is the same as that needed to charge the capacitance of the display structure.

As a result, according to this invention, triboelectrically generated charges can be used to write, re-write or erase a gyricon sheet.

This invention provides a gyricon sheet encapsulated between a conducting plate, and a thin, insulating film.

The invention separately provides a gyricon display addressable by a triboelectric charge.

The invention separately provides for erasing an image formed on a gyricon display using a tribo-electric charge.

The invention separately provides a gyricon display that does not require an external electric power source to form or erase an image from the gyricon display.

The invention separately provides a gyricon display having a substrate that is sufficiently conductive to dissipate the small amounts of charge generated by tribo-electric effects.

According to one exemplary embodiment of the electric paper of this invention, a tribo-electric charge induced on the surface of an insulating film generates a sufficient electric field to change the state of one or more gyricon rotatable elements of the electric paper.

According to a second exemplary embodiment of the electric paper of this invention, the tribo-electrically addressable electric paper can be used to form a whiteboard that does not require chalk, solvent based pens or, in fact, any type of pen.

In the exemplary embodiment of the tribo-electrically addressable electric paper of this invention, sufficient electric energy to produce an image is provided by tribo-electric charges stored and dissipated on a surface of the display.

Gyricon displays designed to be addressed by a stylus can sometimes be adversely affected by tribo-electric effects. For example, in the case of gyricon displays typically addressed by an electrically driven stylus, inadvertently contacting the gyricon sheet with the users finger rather than with the writing stylus can, under certain conditions, cause rotation of the gyricon rotatable elements due to tribo-electric effects.

In another exemplary embodiment of the electric paper of this invention, the elastomer layer of the electric paper is sufficiently conductive to dissipate small amounts of tribo-electrically generated charge. That is, the elastomer layer effectively discharges the tribo electrically generated charge in a time that is less than that required to cause rotatable element rotation. Intentionally applied voltage, as from a powered voltage source such as a writing stylus, has an effectively infinite supply of charge and will deliver a sustained voltage until the desired writing occurs.

In another embodiment, a gyricon display is provided which can be addressed by depositing an addressing charge on the surface of the display but which dissipates the charge over a small period of time which provides for safe handling of the display after a short period of time without experiencing image destructive tribo-electric effects.

BRIEF DESCRIPTION OF THE DRAWINGS

The exemplary embodiments of the invention will be described in detail, with reference to the following figures in which.

DETAILED DESCRIPTION OF EMBODIMENTS

Figure 1:
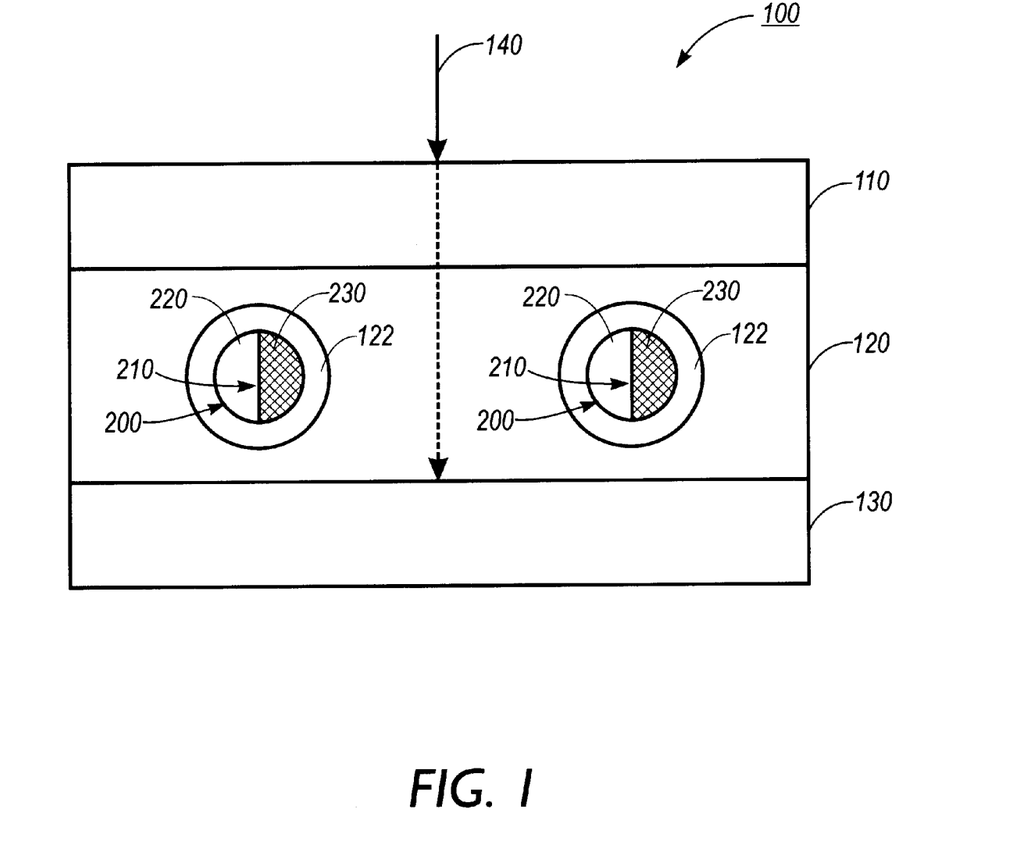
FIG. 1 shows a cross-section of one exemplary embodiment of a triboelectrically addressable display.

FIG. 1 shows a cross-sectional view of one exemplary embodiment of a sheet 100 of tribo-electrically addressable electric paper according to the invention. Specifically, as shown in FIG. 1, a conductive base substrate 130 forms the base substrate of the sheet 100 of tribo-electrically addressable electric paper. Although, this embodiment shows the conductive base substrate 130 to be made integral with the sheet 100, it should be noted that it need not be so. The sheet 100 can be manufactured without the conductive base substrate 130 which can be later provided in the form of a conductive backplane. However, when the gyricon sheet 100 is made with a conductive base substrate 130, then one surface of a gyricon substrate 120 is substantially contiguous with the conductive base substrate 130. The gyricon substrate 120 includes gyricon rotatable elements 200 disposed within the substrate 120. Each gyricon rotatable element 200 has two distinct portions 220 and 230, one black and the other white, and each portion 220 and 230 has a distinct electrical characteristic, i.e., a zeta potential with respect to a dielectric fluid, so that the gyricon rotatable elements 200 are electrically as well as optically anisotropic.

The gyricon rotatable elements 200 are embedded in a sheet of optically 100 transparent material, such as an elastomer layer, that makes up the gyricon substrate 120. The gyricon substrate 120 also contains a multiplicity of cavities 122 and is permeated by a transparent dielectric fluid, such as a plasticizer. The fluid-filled cavities 122 accommodate the gyricon rotatable elements 220. In particular, there is one gyricon rotatable element 200 per cavity 122 in the gyricon substrate 120. The cavities prevent the gyricon rotatable elements 200 from migrating within the gyricon substrate 120. Each gyricon rotatable element 200 can be selectively rotated within its respective fluid-filled cavity 122 by applying an electric field to present either the black portion 230 or the white portion 220 to an observer viewing the surface of the sheet 100. Thus, applying an electrical field that is adjustable in two dimensions causes the black and white portions 230 or 220 of the gyricon rotatable elements 200 to appear as image elements, i.e., subpixels or pixels of a display.

An insulative layer 110 is substantially contiguous with the other surface of the gyricon substrate 120. The insulative layer 110 may be any polyester or plastic material or any other known or later developed transparent material that is sufficiently insulative that tribo-electrically generated charges persist for a time sufficient to cause the gyricon rotatable elements 220 to rotate. The insulative layer 110 is preferably uncoated. Critical features of the insulative layer 110 include its bulk resistivity and its dielectric constant. Bulk resistivity refers to the ability of the material to resist a flow of a charge across its bulk and to hold a voltage. The dielectric constant of the layer is proportional to the capacitance of the layer. The insulative layer 110 is transparent, but if it is not transparent, the conductive base substrate 130 will be transparent.

As shown in FIG. 1, the gyricon rotatable element 200 has two portions 220 and 230. A segment line 210 divides the gyricon rotatable element 200 into two separate sections. The first portion 220 is made using a white pigment. The second portion 230 is made using a black pigment. The gyricon rotatable element 200 can thus either display a white or black face depending on its orientation with respect to a surface of the sheet 100. Although only two gyricon rotatable elements 200 are shown, it should be understood that the gyricon substrate 120 may include a very large number of gyricon rotatable elements 200, depending on the resolution desired. Further, although the gyricon rotatable elements 200 are described as having two sections, one black and one white, it should be understood that each gyricon rotatable element 200 may have more than two portions and may be any two or more two colors, not just black and white. Furthermore, although the gyricon rotatable elements 200 have been described as substantially spherically shaped rotatable elements, they may equally well be substantially cylindrically shaped.

Tribo-electricity is of great importance to xerography, where it is used to impart an electrical charge on the generally dielectric toner particles. This enables the toner particles to be attracted to the image-wise charge on the photoconductor drum, thus developing the charge image. In many forms of xerography, the toner particles are given a charge by causing them to collide and rub against developer beads. Some types of coatings will charge the toner beads positive and others negative.

"Xerography and Related Processes", by J. Dessauer et al., The Focal Press, London and New York, First Edition, 1965, pg. 270, describes the triboelectric process in terms of the Fermi levels of the two materials being rubbed together. The direction of charge transfer depends on the relative positions of the Fermi levels. A triboelectric series can be established by listing a variety of materials in the order of their relative Fermi energies. If the window material of the tribo-electrically addressable electric paper 100 is made of a given material, for example, Mylar, and if it is rubbed by a material having a Fermi energy above that of Mylar, that material will donate electrons to the Mylar, charging the Mylar negative. On the other hand, if the Mylar is rubbed by a material having a Fermi energy below that of Mylar, the Mylar will donate electrons to it, leaving the Mylar with a positive charge.

In practice the Fermi energies of insulators are difficult to determine and trial and error is the best method of determining the triboelectric series specific to the chosen window material. According to this embodiment, the window material is rubbed with a trial stylus material and the resultant polarity and magnitude of charge on the window material is measured with an electrostatic voltmeter.

Dessauer further describes that after two bodies are rubbed together, producing triboelectric charges, it is necessary that at least one of the bodies be a good insulator, thereby preventing the triboelectrically generated charges on one body from recombining with the opposite polarity charges on the other body before the bodies can be effectively separated. The required resistivity is placed at about $10^9$ ohm-cm. The other body can be a conductor. According to this embodiment, it is necessary that the insulative layer 110 have good insulative properties so it will not act to shield the gyricon material from the effects of the triboelectric charge.

In operation, a tribo-electric charge may be applied at the surface of the insulative layer 110, for example, at a point 140 in FIG. 1, by a human finger. In this case, a user seeking to generate a display drags his or her finger on the surface of the insulative layer 110. The users finger acts as a stylus. The user moves his or her finger in the pattern of the display that is desired. The action of dragging a finger on the transparent insulative layer 110 leaves a charge trail that activates the gyricon rotatable elements 200, causing them to rotate one portion toward the surface of the transparent insulative layer 110.

In particular, the tribo-electrically generated charge trail is stored in or on the transparent insulative layer 110 and creates an electric field substantially directed into the gyricon substrate 120. The electric field, generated by the tribo-electrically generated charges stored in or on the transparent insulative layer 110, causes the gyricon rotatable elements 200 to rotate to a particular orientation. Generally, the tribo-electric charge generated by the user moving his finger over the transparent insulative layer 110 causes the gyricon rotatable elements 200 to rotate so that the black portion faces the transparent insulative layer 110, so that an observer sees a black, i.e., filled-in, pixel. This tribo-electrically generated charge is held for a short while but the image storage properties of the gyricon act so that the black portion faces the surface of the display device until it is disrupted by a subsequent opposite electric field.

The display can be erased by using an "eraser" that applies a charge opposite to the tribo-electric charge applied by the user to address the display. Such an "eraser" generates a tribo-electric charge in or on the insulative layer 110 that has an opposite polarity to the charge generated by the user. The action of dragging the "eraser" on the insulative layer 110 leaves a charge trail that has the opposite polarity to the charge trail of the user to activate the gyricon rotatable elements 200, causing the gyricon rotatable elements 200 to rotate the opposite portion toward the surface of the insulative layer.

In particular, the tribo-electrically generated charge trail is stored in or on the surface of the insulative layer 110 and induces an electric field opposite the electric field generated by the stylus or the finger of the user. This electric field generated by the charges stored in the transparent layer 110 causes the gyricon rotatable elements 200 to rotate to a particular orientation. Generally, the tribo-electric charge generated by the eraser causes the gyricon rotatable elements 200 to rotate so that the white portion faces the insulative layer 110, so that an observer sees a white, i.e., blank or empty, pixel.

Thus, the electrical properties of the transparent insulative layer 110 are important for the functioning of the tribo-electrically addressable display. Specifically, the insulative layer 110 must be sufficiently insulative to hold the tribo-electric charge applied by the user or the eraser and it must have sufficient capacitance to store this charge for enough time for the rotatable elements to rotate, in spite of the leakage of charge caused by the finite conductivity of the layer 110. The bulk resistivity p and the dielectric constant $\in$ are important. The product of the bulk resistivity and the dielectric constant ($\rho\in$) is the time constant T. The time constant T of a material corresponds to the rate of charge dissipation in that material. Generally, given the bulk resistivity, the dielectric constant and the time constant, the rate of charge dissipation follows the exponential formula $e^{-t/T}$, where t is the time elapsed.

In general, to successfully address the tribo-electrically addressable sheet 100 of the gyricon display according to the invention, the insulative layer 110 must be able to hold a sufficient charge for a sufficient amount of time to allow an electric field, sufficient to cause the gyricon rotatable elements 200 to rotate, to persist in the sheet 100. Thus, there is a maximum rate of dissipation above which the sheet 100 will not be able to be addressed. The relationship can be expressed as:

$$\rho\in > T_{address,\ max} \quad (1)$$

where:

$\rho$ is the bulk resistivity of the film;

$\in$ is the dielectric constant of the film; and $T_{address,\ max}$ is the time needed for complete rotation of all rotatable elements, typically 100 milliseconds.

Thus, as shown by the relationship above, the product $\rho \in$, or the time constant T, of the material used to form the insulative layer 110 must exceed the worst case time constant $T_{address, max}$ i.e., the rate of charge dissipation must be less than the minimum dissipation that still allows rotation of the rotatable elements.

The tribo-electrically addressable sheet 100 can be used to form a display according to this embodiment that can be manufactured in many different configurations. For example, the tribo-electrically addressable sheet 100 can be made in the size of a standard notepad, which can then be used like a conventional sheet of paper allowing easy transportability. Alternatively, the tribo-electrically addressable sheet 100 can be constructed in the size of a scribble or chalk board. A triboelectrically addressable scribble board can have adhesive backing allowing the display to be connected to a surface, such as, for example, a door or wall. The advantages of a tribo-electrically addressable scribble board include the ability to address the board using the touch of a finger, rather than requiring a pen, marker or chalk, which can easily be lost.

According to another exemplary embodiment of the invention, a gyricon display is provided which is addressed by a conductive stylus connected to a power supply but is not affected by stray or excessive tribo-electric charges, such as caused by handling. The gyricon display according to this exemplary embodiment is referred to as a tribo-electrically suppressed display.

Figure 2:
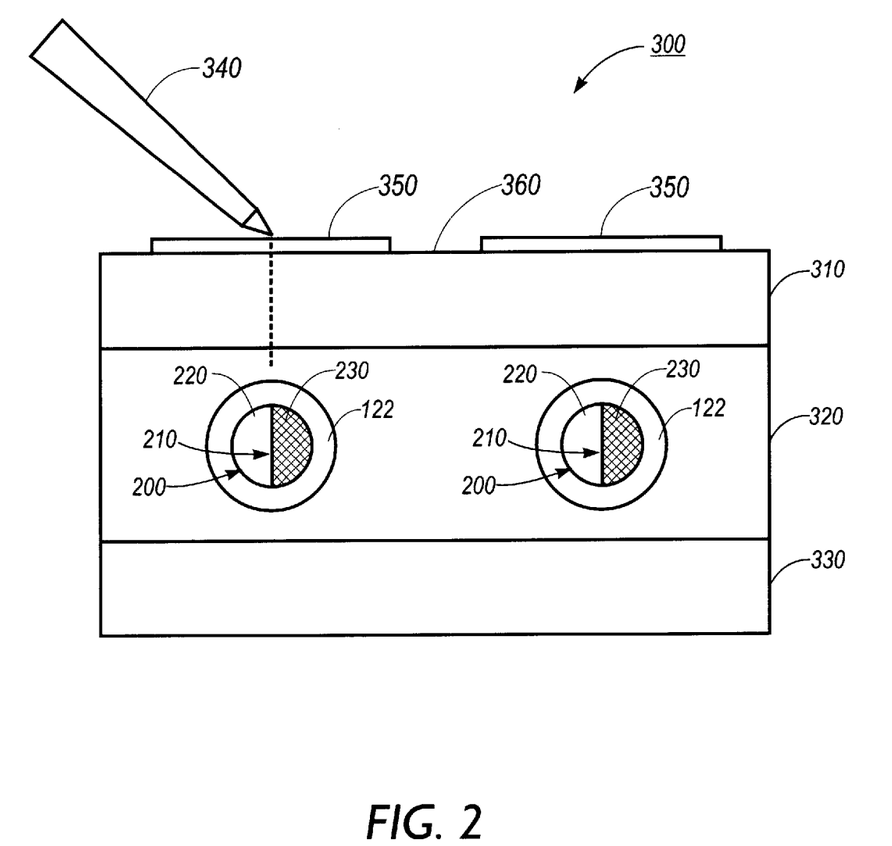
FIG. 2 shows a cross-section of one exemplary embodiment of a triboelectrically suppressed gyricon display.

FIG. 2 is a cross-sectional view of one exemplary embodiment of a sheet 300 of a tribo-electrically suppressed electric paper according to the invention. Specifically, FIG. 2 shows a tribo-electric display addressable using a stylus that includes a conductive base substrate 330 that forms the base substrate of the sheet 300 of the tribo-electrically suppressed electric paper. Again, although this embodiment shows the conductive base substrate 330 being integral with the sheet 300, this need not be so. The sheet 300 can be manufactured without the conductive base substrate 330 which can be provided later as a conductive backplane.

One surface of a gyricon substrate 320 is substantially contiguous with the conductive base substrate 330. The gyricon substrate 320 includes the previously-described gyricon rotatable elements 200 disposed within the substrate.

As described in connection with the previous embodiment, each gyricon rotatable element 200 is both electrically and optically anisotropic. For instance the gyricon rotatable elements 200 may be spherically shaped and have two portions 220 and 230, one black and the other white, and each portion 220 and 230 having a distinct electrical characteristic, i.e., a zeta potential with respect to a dielectric fluid, so that the gyricon rotatable elements 200 are electrically as well as optically anisotropic. The gyricon rotatable elements 200 are embedded in a sheet of optically transparent material, such as an elastomer layer, that makes up the gyricon substrate 320.

A substrate 310 having a structure of conductive islands 350 with channels 360 therebetween on its outer surface is substantially contiguous with the other surface of the gyricon substrate 320. The substrate 310 may be any polyester or plastic material or any other known or later developed material that is sufficiently conductive such that tribo electric charges will be conducted away in a short enough period of time to prevent rotation of the gyricon rotatable elements 200. The conductive islands may be any material, such as indium tin oxide, that is sufficiently conductive that the stylus moving across them at normal writing speed will be able to deposit enough charge on them to nearly or completely raise their voltages to that of the stylus. Typically, this means that the conductive layer should have a sheet resistivity less than a few tens of thousand of ohms per square. As described above in connection with the tribo-electrically addressable electric paper, critical features of the substrate 310 includes its bulk resistivity and its dielectric constant, since these determine how long an individual island retains the charge given to it by the stylus.

Again, either the substrate 310 or the substrate 330 must be made to be sufficiently transparent to provide an image viewing surface for the sheet 300.

In conventionally addressable displays, which are addressed by a stylus 340, contact of the gyricon display with a user's finger rather than with the stylus can inadvertently cause rotation of the gyricon rotatable elements 200. There are two causes of these unwanted effects. The first of these is the tribo-electric deposition of charge on the conductive islands 350 which causes electric fields to manifest and results in inadvertent image changes. Any deposition of charge on the conductive islands 350, either intentional or not, results in image charges accumulating in the elastomer of the gyricon substrate 320 after some period of time. The second of the unwanted affects is caused by the presence of these accumulated image charges. These persisting image charges can cause undesired electric fields to manifest after a change in potential on the conductive islands 350, such as is caused by contact with a finger or other slightly conducting object, and result in inadvertent image changes. This display greatly reduces this problem by selecting an appropriate bulk resistivity for the gyricon substrate 320 and the substrate 310. This allows any deposited triboelectric charge, which is limited in magnitude and occurs over a very short period of time, to be conducted away in a short time compared with the minimum address time, thus causing no rotatable element 200 rotation. Since the stylus is connected to a power supply it can sustain the voltage required for rotatable element 200 rotation for a long enough time to cause the rotatable element 200 to complete rotation.

The following relationship illustrates the relation between the time constant of the elastomer part of the gyricon layer 320 and the substrate 310 and the minimum rate of charge dissipation needed to suppress unwanted rotatable element rotation:

$$\rho \in < T_{address, min} \tag{2}$$

where:

$\rho$ is the bulk resistivity of the elastomer;

$\in$ is the dielectric constant of the elastomer; and $T_{address, min}$ is the minimum time for which some rotatable element rotation is possible, which can be as high as 100 msec.

Thus, the relationship described above shows that for a given material used to form the transparent conductive layer 310 and the gyricon substrate 320, the product of $\rho \in$ must be less than or equal to the minimum rate of charge dissipation 10 which discharges stray tribo-electric charges. If this is accomplished, stray tribo-electric charges are effectively discharged, while the display can still be addressed by the stylus 340.

The elastomer, which may be a material such as Dow Corning Sylgard 184, has a bulk resistivity in excess of $10^{16}$ ohm centimeters. This can be lowered for the requirements of the invention by the addition of chemicals or dopants that promote conductivity, such as fatty acid salts, exemplified by aluminum stearate. These chemicals may be added to the uncured elastomer. Likewise, the substrate 310 can be altered as a low conductivity polymer with a similar time constant as the suitably modified elastomer.

Up to this point the embodiments described have used a gyricon substrate 320 and substrate 310 which have similar time constants or similar bulk resistivities and dielectric constants. Alternatively, the substrate 310 and conductive islands 350 can be designed to retain enough charge on the transparent conductive island 350 for a sufficient period of time to facilitate an image change and then to drain the charge from the transparent conductive island 350. This requires that the substrate 320 and substrate 310 have differing time constants. This allows for faster addressing speeds because the addressing mechanism does not need to stay in contact with a particular transparent conductive island 350 for the entire time to cause rotation of the gyricon rotatable elements 200 associated with that transparent conductive island 350, but can instead deposit the requisite charge and move on. This example must be analyzed in terms of the physical geometries due to the differing time constants of the elastomer and the substrate 310.

One method to do this is to use a conductive material for the channels 360. By controlling the conductivity of the channels 360, or conversely the resistivity of the channels 360, a sufficient charge can be maintained on the conductive islands 350 to insure an image change while allowing charge to leak from the conductive islands 350. When a sufficient amount of charge has leaked from the conductive islands 350 then a sudden change in potential will not cause an image change. As the channels 360 are made up of portions of the substrate 310, this means the resistivity of the substrate 310 must be controlled.

In order to effect an image change by rotating the gyricon rotatable elements 200, the charge density on the conductive islands 350 must remain either relatively stable or above a threshold amount for a period of time sufficient to cause an image change. This is so that a sufficient electric field will be applied for a sufficient length of time to cause rotation of the gyricon rotatable elements 200.

In order to avoid unwanted rotations of the gyricon rotatable elements 200 when the potential is reduced or set to zero on the conductive islands 350, either the charge must removed at a relatively slow rate or the charge density must be less than is needed to cause an element rotation when the potential is reduced or set to zero. This is to avoid undesirable fields created by mobile charges in cavity 122 which had rearranged in response to the charge placed on conductive island 350.

The sequence of events is therefore as follows. First a charge is placed on a conductive island 350 to create a more than sufficient electric field to cause an image change at time $T_1$. However, because the channels 360 are conductive, charge will immediately start to leak from the conductive islands 350. This is why an excess of charge must be placed on the conductive island 350 so that, in the time it takes the new image to form, until time $T_2$, there will still be sufficient charge to create a sufficient field to cause an image change. The time between $T_1$ and $T_2$ can be as large as 100 milliseconds.

At time $T_2$, because the image has changed there is no longer a need for a minimum level of charge to remain on the conductive islands 350 and the charge density continues to drop as charge continues to leak from the conductive islands 350. However, the sheet should not be handled or touched with a grounded object because sufficient charge still exists on the conductive islands 350 to cause an image change during a sudden change in potential on conductive island 350 such as by a sudden charge removal.

However at time $T_3$ the charge remaining on conductive islands 350 has dropped to sufficient levels that the sheet is safe to handle. We can set the difference between times $T_2$ and $T_3$ to be some reasonable number, for instance, we might consider a range of from 1 to 5 seconds acceptable.

Figure 3:
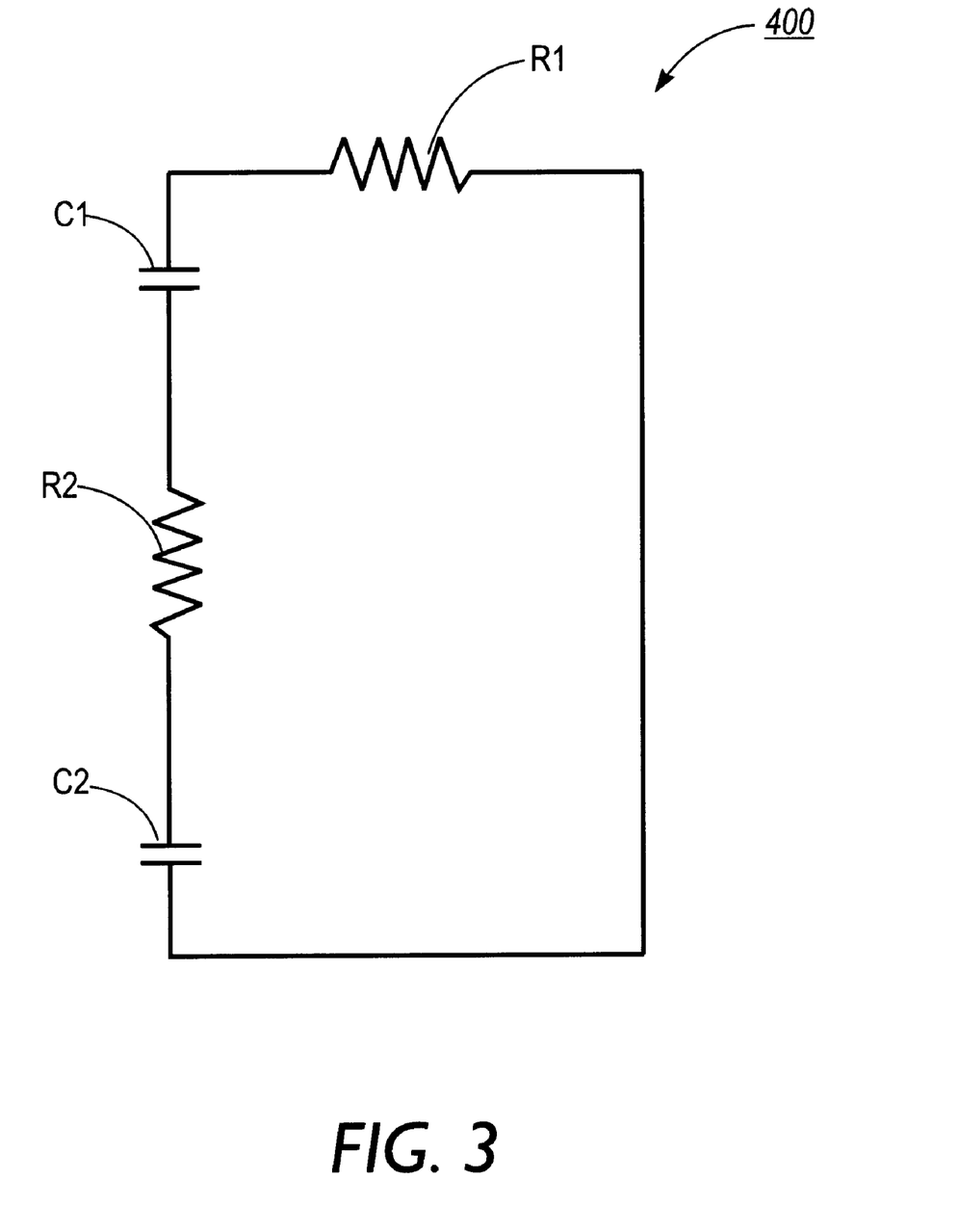
FIG. 3 shows a circuit model diagram of a gyricon device.

Consider the circuit model 400 shown in FIG. 3. The circuit model 400 is a circuit model of the capacitances and resistances in a sheet 300. Resistor R1 represents the resistance in the substrate 310 of the sheet 300. Capacitor C1 represents the capacitance of the substrate 320 between the substrate 310 and the cavity 122. Capacitor C2 represents the capacitance of the substrate 320 between the cavity 122 and the layer 330. Resistor R2 represents the equivalent resistance of the parallel resistances across all the cavities 122 underneath a transparent conductive island 350. If there is only one cavity then resistor R2 would represent the resistance across that single cavity 122. If there are more than one cavity, as is likely, then resistor R2 would represent the addition of all the parallel resistances, keeping in mind that when parallel resistors are added that the equivalent resistance is less than the smallest individual resistance. Therefore as the number of cavities 122 underneath the transparent conductive island 350 increases, the resistor R2 decreases.

The value of resistor R2 for a single cavity can be modeled with the charge mobility and the electric field needed to move the charge to produce and equation:

$$R2 = d^2/Q\mu \tag{3}$$

Where d is the diameter of the cavity,

Q is the charge in the cavity, and $\mu$ is the charge mobility of the charges in the cavity.

The value of resistor R1 can be modeled using the sheet resistance of the layer 310 and a small constant which is the ratio of the size of the sheet to the size of the transparent conductive island to produce an equation:

$$R1 \approx (\rho_\square/2\pi) I_n(w/r_o) \tag{4}$$

Where:

$\rho_\square$ is the sheet resistance of layer 310, w is the width of the sheet and, $r_o$ is the radius of a exemplary conductive island 350.

We know that in order to avoid the unwanted tribo-electric effects that resistor R1 should be larger than resistor R2 to ensure that the potential developed across resistor R2 will always be a small fraction of the applied potential.

We can estimate the charge in a single cavity 122 using Gauss' law and experimental data about the electric field needed to rotate a gyricon rotational element 200 in a cavity 122 to obtain:

$$Q = \in \pi (d^2/4) E \tag{5}$$

Where:

$\in$ is the dielectric constant d is the diameter of the cavity 122, and

E is the electric field needed to rotate an gyricon rotational element 200.

Substituting equation (5) into equation (3) and using the following values:

Number of cavities 122 per transparent conductive island 200=6.25, $\mu \approx 10^9$ $\epsilon = 2\epsilon_0$ $E = 2 \times 10^5$ we obtain a value for resistor R2 equal to approximately $5.75 \times 10^{13}$ ohms or a sheet resistance of layer 310 of $2.62 \times 10^{14}$ ohms per square.

We can estimate the value of C1 and C2 at approximately $5 \times 10^{-15}$ farads, and we know that the time constant of the circuit is approximately the product of resistor R1 and capacitor C1, that is $$T = (R1)(C1) \qquad (6)$$

Substituting the value in for C1 and letting T range from 1 to 5 seconds returns a value for resistor R1 of from approximately $2 \times 10^{14}$ to approximately $1 \times 10^{15}$ ohms or a sheet resistance of approximately $9.11 \times 10^{14}$ to $4.55 \times 10^{15}$ ohms per square. This answer can be verified by comparing it with our estimated value for resistor R2 at $5.75 \times 10^{13}$ ohms to verify that resistor R1 is indeed larger than resistor R2 by a factor of approximately 3.5 to 17.4.

While the value chosen for resistor R1 will vary depending on the different variables discussed above such as for instance, the time constant, the number of cavities beneath a transparent conductive island, the electric field used to rotate a gyricon rotatable element, or the capacitance across a cavity, values for resistor R1 should fall in the range of at least approximately $10^{14}$ ohms to $10^{16}$ ohms using current construction techniques. If for instance a method is found of constructing the sheet 300 such that the resistance R2 is less, then acceptable values for resistance R1 will be less. If for some reason it should be desirable to construct a sheet 300 with larger values of resistor R2, then values of resistor R1 should also be correspondingly higher. Similarly, if methods are used to create a sheet 300 with larger or smaller values of capacitor C1, then smaller or larger values of resistor R1 may be appropriate.

The substrate 310 of the sheet 300 can be implemented using high performance films such as those available from the Westlake Plastics Company located in Lenni, Pa. For instance, Victrex and Ultrason E films manufactured by the Westlake Plastics Company have surfaces resistivities of $1.8 \times 10^{15}$ and $> 10^{14}$ ohms respectively.

The invention has been described in relation to the gyricon display. However, the principles it illustrates can be equally well applied to many other high impedance displays, such as certain liquid crystal displays and electrophoretic displays.

While the invention has been described in conjunction with the preferred embodiments it is described above, as evident that many alternatives, modifications, and variations are apparent to those skilled in the art. Accordingly, the preferred embodiments in the invention set forth above are intended to be illustrative and not limiting. Various changes may be made without departing from the spirit and scope of the invention.

What is claimed is:

1. A display device having two spaced apart surfaces, wherein one surface is a charge deposition surface, comprising:
   a) a display substrate, having a first resistivity and a first time constant
   b) a multiplicity of conductive islands on the charge deposition surface, and
   c) a resistive portion having a second resistivity and a second time constant interposed between the conductive islands and the display substrate.

2. The display device of claim 1 wherein the first resistivity and the second resistivity are different from each other.

3. The display device of claim 2 wherein the first resistivity is less than the second resistivity.

4. The display device of claim 3 wherein the first resistivity is less than the second resistivity by a factor of at least approximately 3.

5. The display device of claim 3 wherein the first resistivity is less than the second resistivity by a factor of no more than approximately 18.

6. The display device of claim 2 wherein the first resistivity is between approximately $10^{14}$ ohms and $10^{16}$ ohms.

7. The display device of claim 1 wherein the value of the first resistivity is chosen such that substantially all of any charge deposited on a conductive island will migrate off of the island in less than approximately 5 seconds.

8. The display device of claim 1 wherein the display substrate comprises a gyricon display substrate having rotational elements contained in cavities therein, the cavities being associated with no more than 1 conductive island, there is a first capacitance between any conductive island and the cavities associated therewith, there is a first time constant comprising the product of the first resistance and the first capacitance, and the time constant is between approximately 1 to approximately 5 seconds.

9. The display device of claim 1 wherein the second surface is at least partially conductive.

10. The display device of claim 1 wherein the second surface is substantially conductive.

11. The display device of claim 1 wherein the second surface is conductive.

12. The display device of claim 1 wherein the first resistivity and the second resistivity are substantially the same.

13. The display device of claim 1 wherein the first resistivity and the second resistivity are at least $10^{16}$ ohm centimeters.

14. The display device of claim 1 wherein the value of the first resistivity and the second resistivity is chosen such that substantially all of any charge deposited on a conductive island will migrate off of the island in less than approximately 100 milliseconds.

15. The display device of claim 1 wherein the first time constant and the second time constant are substantially the same.

16. The display device of claim 1 wherein the first time constant and the second time constant are different.

17. The display device of claim 1 wherein the first time constant is less than 100 milliseconds.

18. The display of claim 1 wherein the display substrate is a gyricon substrate.

19. A method of addressing a display device comprising:
   a) depositing charge on at least a portion of a surface of the display device,
   b) retaining sufficient charge to effect an image change on at least a portion of the surface for approximately at least 100 milliseconds
   c) removing at least a portion of the deposited charge from the surface of the display device.

20. The method of claim 19 wherein the step of retaining sufficient charge comprises retaining sufficient charge for approximately 100 milliseconds.

21. The method of claim 19 wherein the step of removing at least a portion of the deposited charge comprises removing charge over a period of time from approximately 1 to approximately 5 seconds.

22. The method of claim 19 wherein the step of removing at least a portion of the deposited charge comprises removing charge over a period of time of no more than approximately 100 milliseconds.

23. The method of claim 19 wherein the step of removing at least a portion of the deposited charge comprises allowing charge to leak from the surface of the display.

24. The method of claim 19 wherein the step of removing at least a portion of the deposited charge comprises providing a resistive path for the movement of the charge from the surface of the display.

25. The method of claim 19 wherein the step of removing at least a portion of the deposited charge comprises removing substantially all of the deposited charge.

* * * * *